United States Patent
Wu et al.

(10) Patent No.: US 6,611,308 B2
(45) Date of Patent: Aug. 26, 2003

(54) CONE PROTRUSION IN MULTI-DOMAIN VERTICALLY ALIGNED LIQUID CRYSTAL DISPLAY

(75) Inventors: Long-Hai Wu, Taoyuan Shien (TW); Sakae Tanaka, Taoyuan Shien (TW)

(73) Assignee: Hannstar Display Corp., Taipei (TW)

(*) Notice: Subject to any disclaimer, the term of this patent is extended or adjusted under 35 U.S.C. 154(b) by 222 days.

(21) Appl. No.: 09/845,520

(22) Filed: Apr. 30, 2001

(65) Prior Publication Data

US 2002/0063832 A1 May 30, 2002

(30) Foreign Application Priority Data

Nov. 30, 2000 (TW) .................................... 89125521 A

(51) Int. Cl.[7] ............................................. G02F 1/1337
(52) U.S. Cl. ........................ 349/129; 349/130; 349/113
(58) Field of Search ................................. 349/129, 130, 349/113, 143, 181, 134

(56) References Cited

U.S. PATENT DOCUMENTS

| | | | | |
|---|---|---|---|---|
| 6,285,123 B1 | * | 9/2001 | Yamada et al. ............. 313/495 |
| 6,369,870 B1 | * | 4/2002 | Koma ......................... 349/130 |
| 6,410,368 B1 | * | 6/2002 | Kawasaki et al. .......... 438/145 |
| 6,452,573 B1 | * | 9/2002 | Martinot-Lagarde et al. .. 345/8 |
| 6,456,349 B1 | * | 9/2002 | Hanyu et al. ................ 349/134 |
| 6,471,903 B2 | * | 10/2002 | Sherman et al. .......... 264/328.1 |
| 6,483,643 B1 | * | 11/2002 | Zuchowski .................. 359/443 |
| 6,501,526 B1 | * | 12/2002 | Oh .............................. 349/155 |

* cited by examiner

*Primary Examiner*—John F. Niebling
*Assistant Examiner*—Olivia T Luk
(74) *Attorney, Agent, or Firm*—Klein, O'Neill & Singh, LLP.

(57) ABSTRACT

A pixel unit included in a multi-domain vertically aligned liquid crystal display is provided. The pixel unit includes a first insulating substrate having a first side and a second side, a second insulating substrate having a third side and a fourth side, a plurality of liquid crystal molecules filled between the first side of the first insulating substrate and the fourth side of the second insulating substrate, an electric field generation device for providing an electric field to change alignment of the liquid crystal molecules, and a cone protrusion formed on the first side of the first insulating substrate for generating an advance inclination of the liquid crystal molecules around the cone protrusion.

5 Claims, 4 Drawing Sheets

CONE PROTRUSION IN MULTI-DOMAIN VERTICALLY ALIGNED LIQUID CRYSTAL DISPLAY

FIELD OF THE INVENTION

The present invention relates to a pixel unit, and more particularly to a pixel unit included in a multi-domain vertically aligned liquid crystal display.

BACKGROUND OF THE INVENTION

The current trend is towards liquid crystal displays for achieving a larger panel size and a higher resolution. However, the characteristics of response time and wide-viewing angles of a liquid crystal display are still needed to be improved.

In order to improve the response time and the wide-viewing angles, a multi-domain vertically aligned (MVA) liquid crystal display is developed as shown in FIGS. 1(a) and (b). Liquid crystal molecules 13 around protrusions 12 which are formed on an upper substrate 10 and a lower substrate 11 are aligned with an advance inclination as shown in FIG. 1(a) by the protrusions 12. Therefore, when the liquid crystal molecules 13 are applied with an electric field, the liquid crystal molecules 13 are in the inclination state, so that the response time and the wide-viewing angle are improved.

Please refer to FIGS. 2(a) and (b) showing another type of a multidomain vertically aligned liquid crystal display. The protrusion 22 is only formed on the upper substrate 20, and the lower substrate 21 has corresponding slits 23 thereon. Therefore, the liquid crystal molecules 24 are aligned as those in FIG. 1, and the response time and the wide-viewing angle of the multi-domain vertically aligned liquid crystal display are improved.

The fabricating processes of the foresaid multi-domain vertically aligned liquid crystal display are complex, so that a cruciform bump structure 31 formed around a pixel electrode 30 as shown in FIG. 3 is developed. The fabricating process is easier, and the four regions having different alignments of the liquid crystal molecules are formed. However, disclination lines are generated at some positions around the pixel electrode, and the transmittance of the panel of the liquid crystal display are decreased.

The present invention provides a pixel unit for being used in a multi-domain vertically aligned liquid crystal display to overcome the foresaid drawbacks.

SUMMARY OF THE INVENTION

It is an object of the present invention to provide a pixel unit included in a multi-domain vertically aligned liquid crystal display.

In accordance with present invention, the pixel unit includes a first insulating substrate, a second insulating substrate, a plurality of liquid crystal molecules, an electric field generation device, and a cone protrusion.

The first insulating substrate has a first side and a second side.

The second insulating substrate has a third side and a fourth side.

A plurality of liquid crystal molecules are filled between the first side of the first insulating substrate and the fourth side of the second insulating substrate.

The electric field generation device provides an electric field to change alignment of the liquid crystal molecules.

The cone protrusion is formed on the first side of the first insulating substrate for generating an advance inclination of the liquid crystal molecules around the cone protrusion.

Preferably, the first substrate and the second substrate are substrates pervious to light.

Preferably, the substrates are glass substrates.

In addition, the electric field generation device includes a pixel electrode formed on the fourth side of the second insulating substrate, and a common electrode formed on the first side of the first insulating substrate.

Preferably, the cone protrusion is disposed above a center of the pixel electrode.

It is another object of the present invention to provide a method for fabricating a cone protrusion in a fabricating process of a liquid crystal display.

In accordance with the present invention, the method includes steps of providing an insulating substrate, forming a positive photoresist layer on the insulating substrate, performing an exposure on the positive photoresist layer by using a mask, wherein a masking region of the mask is a pattern having a masking rate decreased progressively from center to surrounding, and performing a development to remove the positive photoresist layer and form a cone protrusion on the insulating substrate.

Preferably, the insulating substrate is a substrate pervious to light.

Preferably, the substrate is a glass substrate.

Preferably, the masking region is circle-shaped.

Preferably, the liquid crystal display is a multi-domain vertically aligned liquid crystal display.

It is another object of the present invention to provide a method for fabricating a cone protrusion in a fabricating process of a liquid crystal display.

In accordance with the present invention, the method includes steps of providing an insulating substrate, forming a negative photoresist layer on the insulating substrate, performing an exposure on the negative photoresist layer by using a mask, wherein a masking region of the mask is a pattern having a masking rate decreased progressively from center to surrounding, and performing a development to remove the negative photoresist layer and form a cone protrusion on the insulating substrate.

Preferably, the insulating substrate is a substrate pervious to light.

Preferably, the substrate is a glass substrate.

Preferably, the masking region is circle-shaped.

Preferably, the liquid crystal display is a multi-domain vertically aligned liquid crystal display.

The present invention may best be understood through the following descriptions with reference to the accompanying drawings, in which:

DETAILED DESCRIPTION OF THE PREFERRED EMBODIMENTS

Figure 1A:
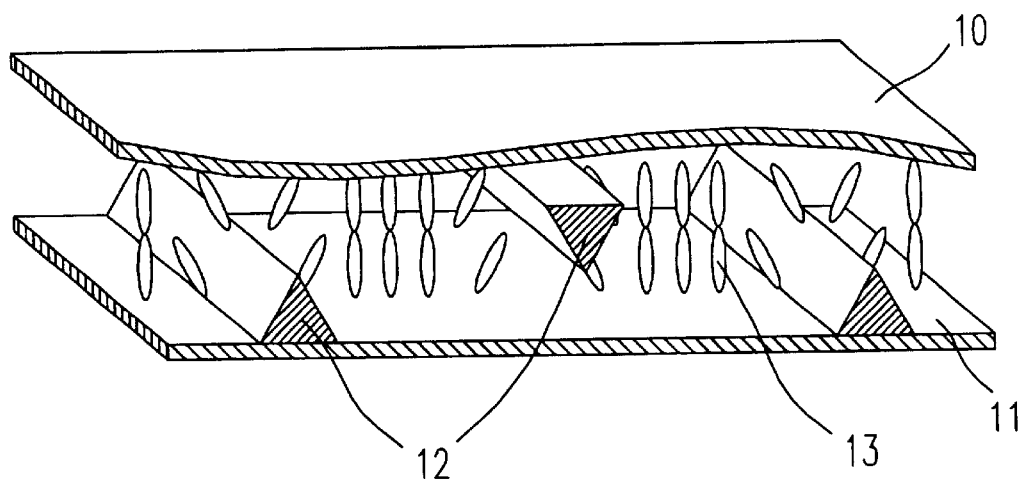
FIGS. 1(a) and (b) are schematic views showing a conventional multi-domain vertically aligned liquid crystal display.
Figure 1B:
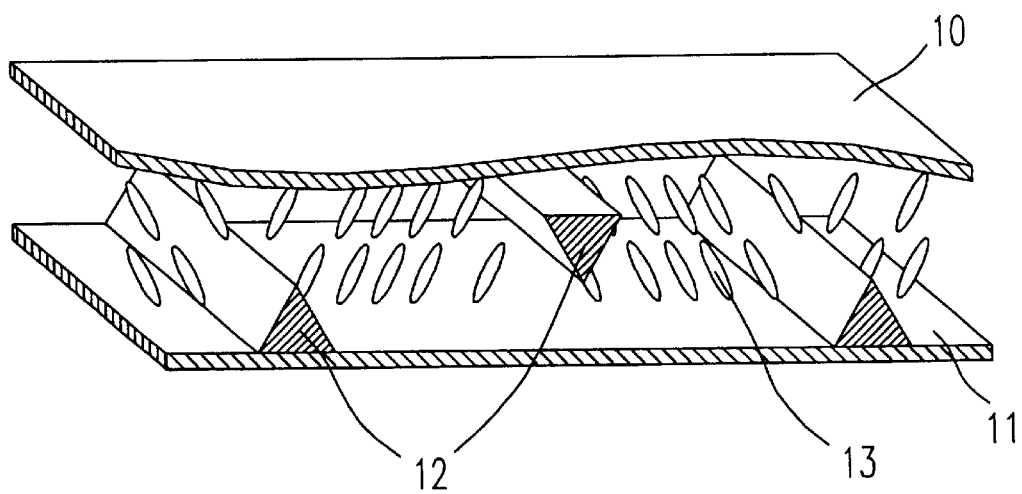
Figure 2A:
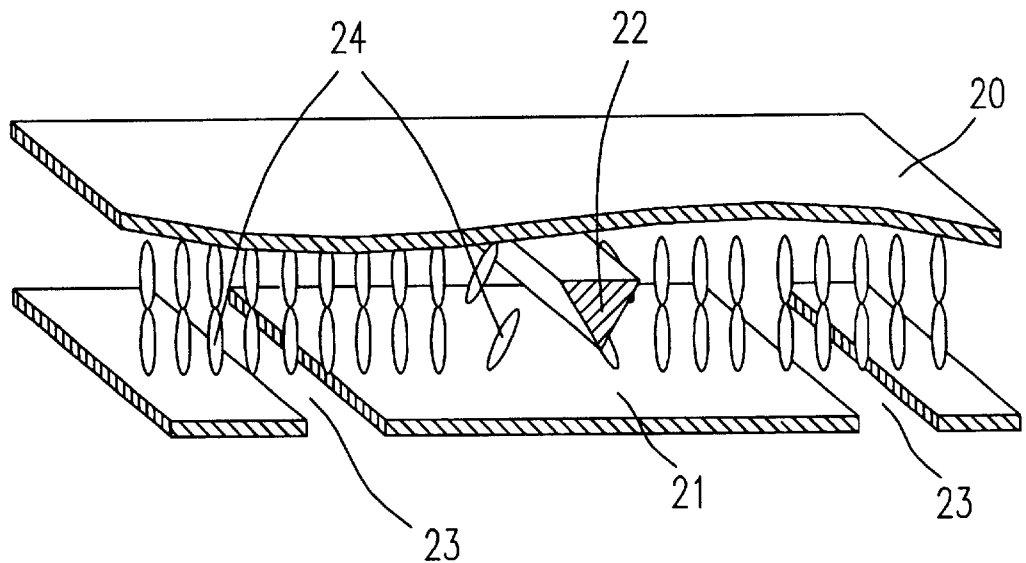
FIGS. 2(a) and (b) are schematic views showing another conventional multi-domain vertically aligned liquid crystal display.
Figure 2B:
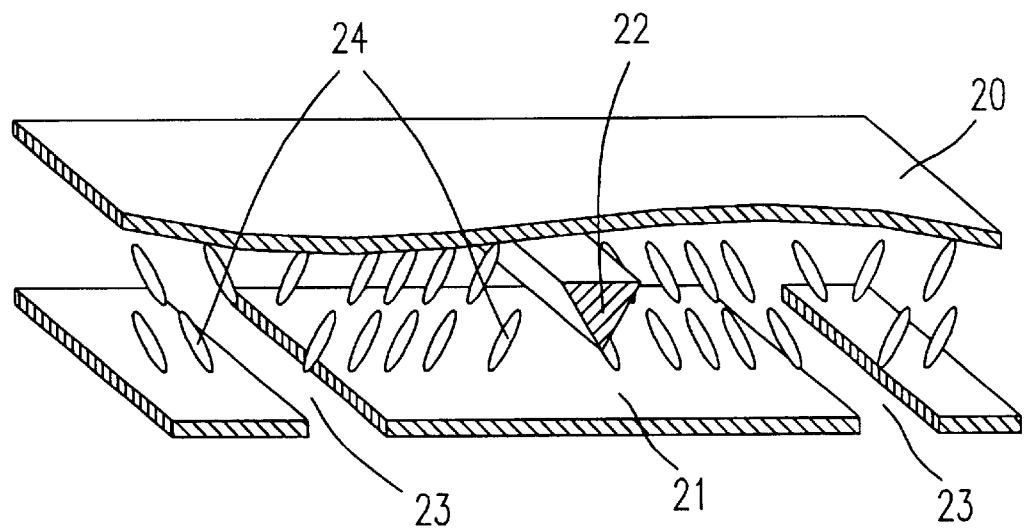
Figure 3:
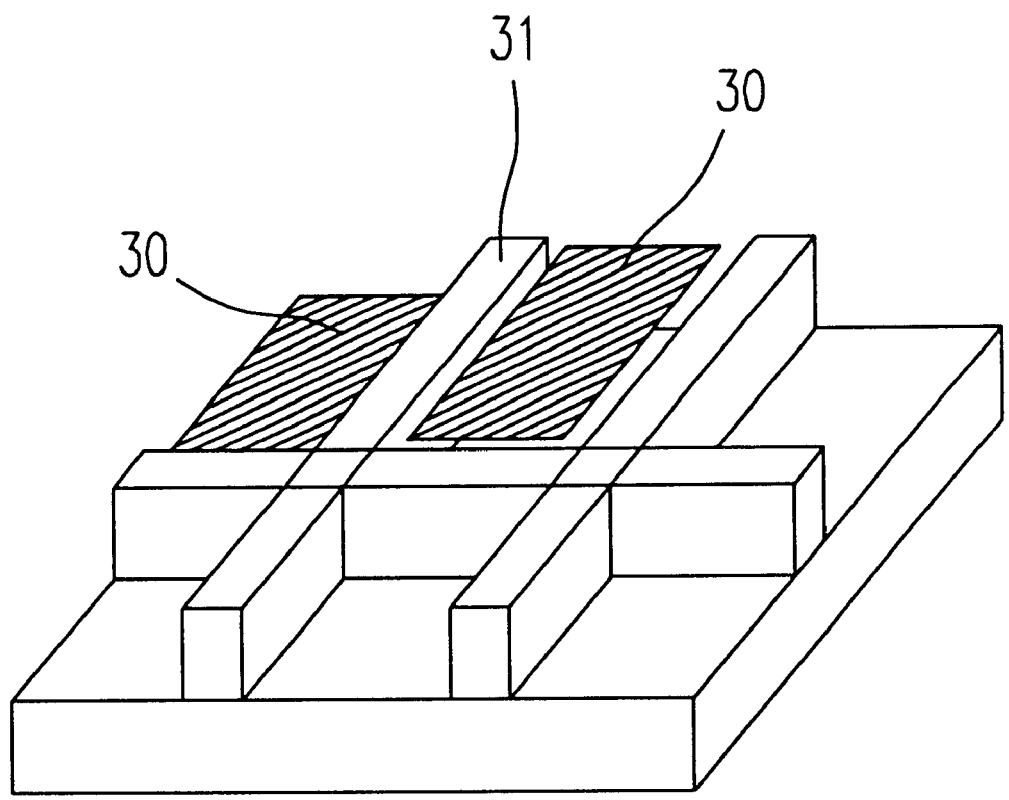
FIG. 3 is a schematic view showing a cruciform bump structure formed around a pixel electrode in a conventional multi-domain vertically aligned liquid crystal display.
Figure 4A:
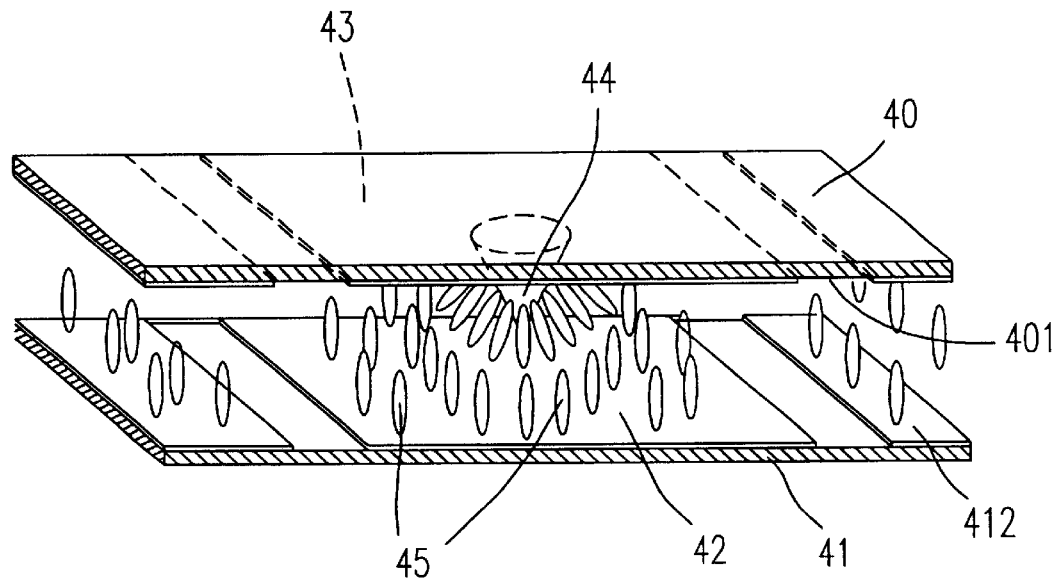
FIGS. 4(a) and (b) are schematic views showing the pixel electrode according to the preferred embodiment of the present invention.

FIGS. 4(a) and (b) are schematic views showing the structure of the multi-domain vertically aligned liquid crystal display provided by the present invention. The multi-domain vertically aligned liquid crystal display includes plural pixel units having the same structures, and only a pixel unit is shown in FIG. 4. The pixel unit includes a first insulating substrate 40 as a color filter, a second insulating substrate 41 having switching elements, i.e. a thin film transistor, thereon, plural liquid crystal molecules 45 filled between the first side 401 of the first insulating substrate 40 and the second side 412 of the second insulating substrate 41.

The pixel unit further includes a pixel electrode 42 formed between the second side 412 of the second insulating substrate 42 and the first side 401 of the first insulating substrate 40, and a common electrode 43 to form an electric field generation device. The electric field generation device provides electric field to change the alignment of the liquid crystal molecules 45.

Figure 4B:
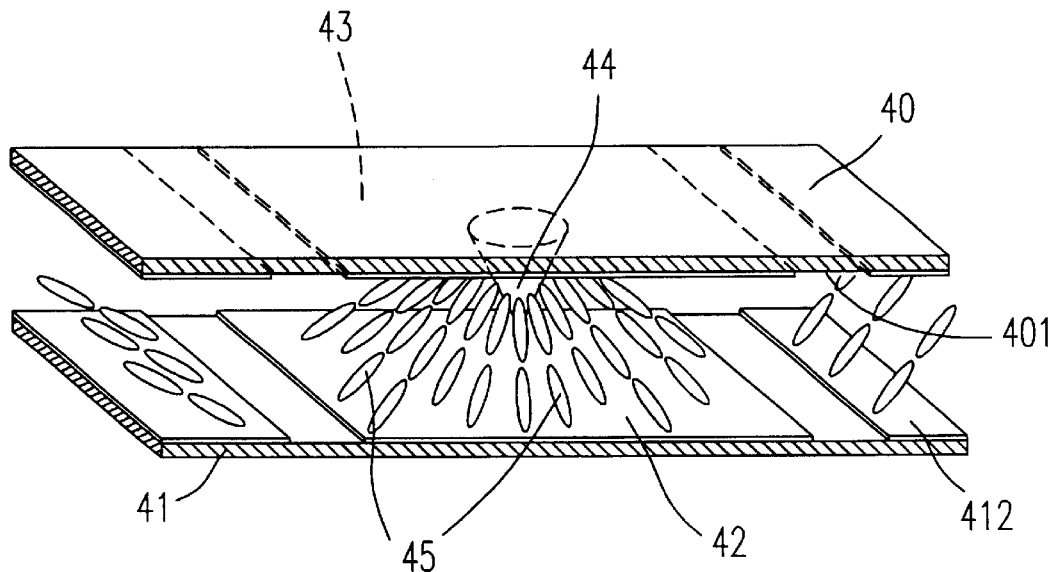

A cone protrusion 44 is disposed on the first side 401 of the first insulating substrate 40 above the center of each pixel electrode 42. The liquid crystal molecules around the cone protrusion 44 have an advance inclination with 360 degree symmetry as shown in FIG. 4(a). When the electric field generation device provides an electric field, the alignment of the liquid crystal molecules 45 are cone-shaped as shown in FIG. 4(b). Therefore, the viewing angle could be improved and the disclination lines could be decreased by the cone alignment.

The method for fabricating the foresaid cone protrusion 44 includes steps of forming a positive photoresist layer on the insulating substrate, performing a front or back exposure on the positive photoresist layer by using a mask, wherein the masking pattern is a circle having a masking rate decreased progressively from the center to surrounding, and performing a development to remove the exposed positive photoresist layer. Since the masking pattern is a circle having a masking rate decreased progressively from the center to surrounding, the exposing energy is increased progressively from the center to surrounding. Therefore, the height of the remaining positive photoresist layer is decreased progressively from the center to surrounding. In addition, if a negative photoresist layer is used in the fabricating process provided by the present invention, the pervious region is a circle having a pervious rate decreased progressively from the center to surrounding.

The first insulating substrate and the second insulating substrate could be glass substrates pervious to light. The cone protrusion could be a cone having plural sides and be used in a multi-domain vertically aligned liquid crystal display.

The present invention provides cone protrusions in each pixel unit of a liquid crystal display. Hence, the viewing angle could be improved and the disclination lines could be decreased by the alignment of the liquid crystal molecules with 360 degree symmetry.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A pixel unit comprised in a multi-domain vertically aligned liquid crystal display comprising:

a first insulating substrate having a first side and a second side;

a second insulating substrate having a third side and a fourth side;

a plurality of liquid crystal molecules filled between said first side of said first insulating substrate and said fourth side of said second insulating substrate;

an electric field generation device for providing an electric field to change alignment of said liquid crystal molecules; and a cone protrusion formed on said first side of said first insulating substrate for generating an advance inclination of said liquid crystal molecules around said cone protrusion.

2. The pixel unit according to claim 1, wherein said first substrate and said second substrate are substrates pervious to light.

3. The pixel unit according to claim 2, wherein said substrates are glass substrates.

4. The pixel unit according to claim 1, wherein said electric field generation device comprises:

a pixel electrode formed on said fourth side of said second insulating substrate; and a common electrode formed on said first side of said first insulating substrate.

5. The pixel unit according to claim 4, wherein said cone protrusion is disposed above a center of said pixel electrode.

* * * * *